(12) United States Patent
Volkov et al.

(10) Patent No.: US 8,915,821 B2
(45) Date of Patent: Dec. 23, 2014

(54) MULTIPLE-ROW EPICYCLIC GEAR

(75) Inventors: Gleb Yurievich Volkov, Kurgan (RU); Eduard Vladimirovich Ratmanov, Kurgan (RU); Dmitry Eduardovich Ratmanov, legal representative, Kurganskaya oblast (RU)

(73) Assignee: Statoil Petroleum AS, Stavanger (NO)

( * ) Notice: Subject to any disclaimer, the term of this patent is extended or adjusted under 35 U.S.C. 154(b) by 330 days.

(21) Appl. No.: 13/501,813

(22) PCT Filed: Oct. 14, 2010

(86) PCT No.: PCT/NO2010/000362
§ 371 (c)(1),
(2), (4) Date: Oct. 22, 2012

(87) PCT Pub. No.: WO2011/046447
PCT Pub. Date: Apr. 21, 2011

(65) Prior Publication Data
US 2013/0072344 A1    Mar. 21, 2013

(30) Foreign Application Priority Data

Oct. 15, 2009  (RU) .................................. 2009138186

(51) Int. Cl.
*F16H 1/46*  (2006.01)
*F16H 1/28*  (2006.01)

(52) U.S. Cl.
USPC .......................................... 475/330; 475/344

(58) Field of Classification Search
USPC .................. 475/330, 344, 345, 346, 347, 903
See application file for complete search history.

(56) References Cited

U.S. PATENT DOCUMENTS

| 3,640,150 | A | * | 2/1972 | Leiner et al. | 475/332 |
| 4,513,637 | A | * | 4/1985 | Hirt | 475/338 |
| 4,721,016 | A | * | 1/1988 | Burandt | 475/342 |
| 4,751,855 | A | * | 6/1988 | Hudson | 475/159 |
| 4,834,192 | A | * | 5/1989 | Hansson | 173/178 |
| 6,179,743 | B1 | | 1/2001 | Morrow | |
| 6,540,641 | B2 | * | 4/2003 | Kishimoto | 475/342 |

FOREIGN PATENT DOCUMENTS

| RU | 2 222 733 C2 | 1/2004 |
| SU | 1 059 326 A1 | 12/1983 |
| SU | 1059326 A | * 12/1983 |
| SU | 1216494 A | 3/1986 |
| WO | WO 98/23883 | 6/1998 |

* cited by examiner

*Primary Examiner* — Roger Pang
(74) *Attorney, Agent, or Firm* — Birch, Stewart, Kolasch & Birch, LLP

(57) ABSTRACT

A multiple-row epicyclic gear includes a carrier with planet gears arranged in rows, as well as a composite central ring gear, having major crowns, with friction spacer rings disposed there between, are also mounted in the housing. The elements of the central ring gear are axially spring loaded. The end faces of the frictional spacer rings and counter-oriented end faces of the major crowns have tapered surfaces being in frictional contact. The friction spacer rings are spliced and arranged to bring their outer cylindrical surfaces into frictional contact with the inner cylindrical surface of the housing. The planet gears are disposed on the carrier in rows in corresponding apertures (or through openings) formed in the carrier. The optimal cone apex angle ($\delta$) of the contacting tapered end faces of the major crowns and tapered end faces of the friction spacer rings is in the range 60-90°.

13 Claims, 2 Drawing Sheets

MULTIPLE-ROW EPICYCLIC GEAR

TECHNICAL FIELD

The invention relates to mechanical gearing, namely to epicyclic or planetary gears. The invention may be used in downhole equipment, as well as in other fields, where minimizing radial dimensions is desirable.

BACKGROUND ART

A well known toothed epicyclic gear comprises a housing, a central internally toothed ring gear fixed therein, a central gear and a carrier with planet gears. Improvement of load bearing capacity of such gear without increasing its radial dimension may be achieved by increasing the axial length of the toothed gears. However, when the axial length to diameter ratio of a planet gear exceeds 1.5, such increase becomes ineffective due to the unequal distribution of load along the tooth.

It is known to use an epicyclic gear comprising several rows of planet gears with a common carrier, with central ring gears axially movably mounted on a cylindrical link, and a load balancing unit for balancing load among the rows of planet gears, said unit arranged in the form of spacing disks, mounted on straight-toothed splines on the cylindrical link and having flanking cams with a slanting profile. The central ring gears are freely mounted on the cylindrical link and also have flanking cams with a slanting profile, which interact with the cams of the spacing disks.

Such arrangement has drawbacks, such as complexity of manufacture—additional processing of the splines on inner and outer cylindrical surfaces of the parts, as well as of the cams on their flanking surfaces; increased radial dimensions due to flanking cams and rings; limited accumulated teeth misalignment, which may be compensated as an error by said balancing unit.

It is also known to use toothed epicyclic gears comprising a sun gear, a crown gear and a carrier with, each of said planet gears consists of two separate toothed gears, the flanking surfaces of which are pressed to each other by means of springs, one of said toothed gears interacting with the sun gear and the other one—with the crown gear. Frictional bond in the contacts of separate gears provides a balanced distribution of load among all engagements in the planet gear.

A drawback of such arrangement consists in an unavoidable increase in the radial dimensions of the planet gears and hence of the whole gear. Axial dimensions of such gear are also large, as its planet gears need to be twice as wide as the traditionally used ones.

It is further known to use a multiple-row epicyclic gear comprising a housing, a composite internally toothed central gear, a carrier with rows of planet gears mounted thereon. In this context the term "composite" denotes a central gear made up of multiple assembled component parts. Each of said planet gears includes axially spring loaded externally toothed friction disks. The internally toothed central gear is composite, having major crowns and friction spacer rings arranged between said crowns. Said major crowns and friction spacer rings of the central gear are mounted in the housing in an axially movable manner and are axially spring loaded. Friction interaction between major crowns and friction spacer rings is performed on flat end faces. The toothed crowns of the central gear are connected with the latter by means of keys or spline connections, causing disadvantages of such arrangement, because, on the one hand, such arrangement is characterized by lower production efficiency due to the need for processing the splines, and, on the other hand, radial dimensions become larger. Besides, the contact between the frictionally contacting elements is performed on flat end faces. Powerful and therefore large hold-down units are required to achieve the necessary interaction force.

SUMMARY OF THE INVENTION

The objective underlying the present invention is increasing the inventory of means, namely in providing a novel multiple-row epicyclic gear that is efficient in production.

The technical result achieved by the present invention is improving load bearing capacity.

The multiple-row epicyclic gear includes a housing with an externally toothed central shaft mounted therein, a common carrier with planet gears mounted in rows thereon, and a composite central internally toothed ring gear having major crowns and friction spacer rings, arranged there between, the elements of the central ring gear being pressed in an axial direction. The inventive gear differs from the known multiple-row epicyclic gear in that the end faces of the friction spacer rings and counter-oriented end faces of the major crowns have tapered surfaces being in frictional contact, wherein the friction spacer rings are spliced and arranged to bring their outer cylindrical surfaces into frictional contact with the inner cylindrical surface of the housing.

The planet gears are preferably disposed in rows in corresponding apertures or openings formed in the common carrier. Each planet gear is disposed in a separate aperture or opening. The externally toothed central shaft may be single-crowned and may be made in the form of a common gear. The end faces of the friction spacer rings and counter-oriented end faces of the major crowns have tapered surfaces both have a cone apex angle $\delta$. The cone apex angle is preferably selected within the range $\delta=60\text{-}90°$.

In order to better illustrate the distinguishing features of the invention, a preferred embodiment of the invention is described below as a non-limiting example. The example describes a gear with a single-crowned central shaft made in the form of a common gear and having separate apertures made in the carrier so that planet gears are disposed in them.

BRIEF DESCRIPTION OF THE DRAWINGS

The invention will be described in detail with reference to the attached figures. It is to be understood that the drawings are designed solely for the purpose of illustration and are not intended as a definition of the limits of the invention, for which reference should be made to the appended claims. It should be further understood that the drawings are not necessarily drawn to scale and that, unless otherwise indicated, they are merely intended to schematically illustrate the structures and procedures described herein. The embodiment is illustrated by the figures, which show:

DETAILED DESCRIPTION

Figure 1:
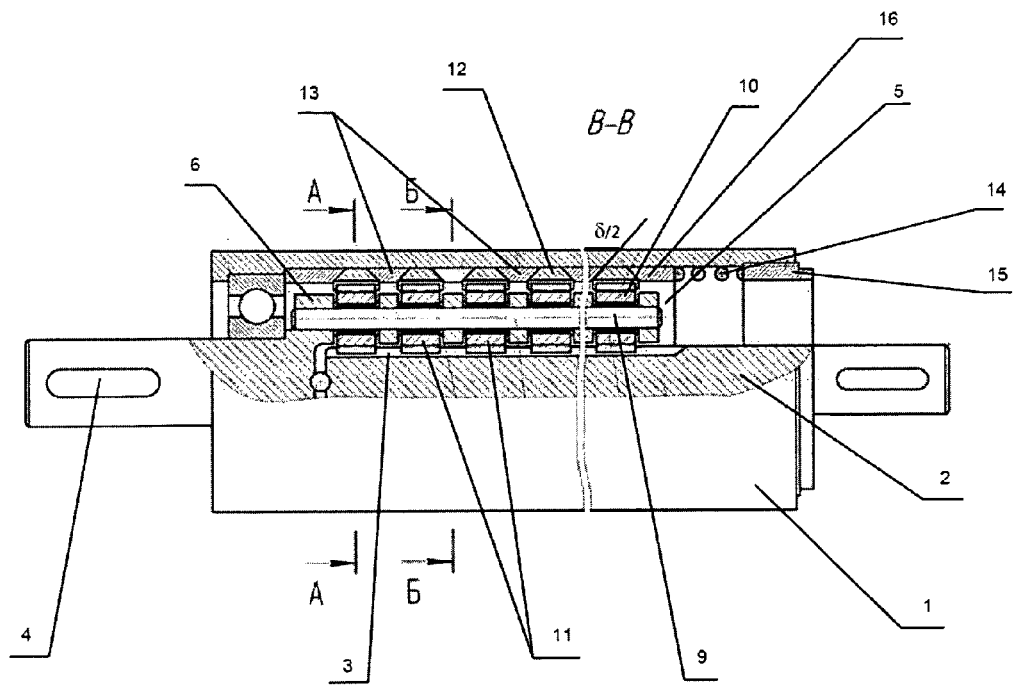
FIG. 1 a longitudinal axial sectional view of the arrangement.

The following reference signs are used in the above FIGS. 1-4:

1—housing; 2—central shaft; 3—common gear; 4—carrier; 5—shaft bore or cavity in the carrier; 6—lateral wall of the carrier; 7—apertures; 8—bores for planet gear shafts;

9—shafts of the planet gears; 10—bushings; 11—planet gears; 12—internally toothed ring gears; 13—friction spacer rings; 14—spring; 15—cup nut; 16—outer ring; 17—spacer ring cut.

The epicyclic gear comprises a cylindrical housing 1 with an externally toothed central shaft 2 mounted therein, said central shaft being single-crowned and made in the form of a common gear 3, which simplifies the arrangement and improves its reliability. In other embodiments, the central shaft may be made with a composite gear as disclosed in the known multiple-row epicyclic gear. A carrier 4 having a blind-end shaft bore 5 is also mounted in the housing. The blind-end shaft bore 5 extends into the carrier 4 from a first end of the carrier 4. The opposite, second end of the carrier 4 is supported by a suitable bearing, such as a roller bearing, mounted in the cylindrical housing 1. The gear 3 is disposed in said blind-end bore of the carrier 4. Parallel rows of radial apertures 7 are arranged through a lateral wall 6 of the carrier 4 in such manner that the apertures within one row are regularly distributed over the circumference. The lateral wall 6 of the carrier 4 has a substantially annular cross-section. The apertures are separated from each other. In this example, each row has three apertures, with angles between their axes making 120°. The apertures 7 are regularly distributed along three longitudinal axes. The lateral wall 6 of the carrier has three open-ended longitudinal axial bores 8. Each axial bore 8 extends through the radial apertures 7 of its own segment of the wall 6 of the carrier 4. Each of the three rotatable shafts 9 included in the arrangement is mounted in each longitudinal bore 8. Bushings 10 are disposed on each pivotal shaft 9 for the planet gears, and a planet gear 11 is fixed on each bushing 10. The bushings 10 with the planet gears 11 fixed thereon are disposed such that the toothed surface of the planet gears 11 extends beyond the lateral outer surface of the carrier through the apertures 7, wherein one aperture corresponds to each of the planet gears.

An equivalent alternative to the apertures may be provided in the form of radial through openings formed in the carrier, which, like the apertures, are separated from each other by partition walls, whereby one through openings corresponds to each planet gear.

Major crowns—internally toothed ring gears 12 are mounted in the housing 1, the former being intended for contacting the planet gears 11 forming the planet gear rows. Friction spacer rings 13 are mounted between the toothed ring gears 12. The toothed ring gears 12 and the frictional spacer rings 13 form a composite central internally toothed ring gear as follows: the toothed ring gears 12 and the frictional spacer rings 13 in their cross-section have the form of trapezoids, which are counter-oriented in such manner that, for toothed ring gears 12, the smaller bases of the trapezoid face outwards away from the ring gear towards the inner wall of the housing 1, and, for the spacer rings 13, the smaller bases face inwards towards the carrier 4. Tapered surfaces of the toothed ring gears 12 formed thereby extend inside the tapers of the spacer rings 13 adjacent to said toothed ring gears 12. The toothed ring gears 12 and the spacer rings 13, located there between, contact the inner surface of the housing with their smooth cylindrical circumferential surfaces. These elements of the central shaft are mounted so as to allow axial movement. Between the aforementioned tapered surfaces friction contact is provided by means of spring loading using a spring loading arrangement having a spring 14 mounted in the housing 1, said spring loading the end face of an outer ring 16 that closes the outer toothed ring gear 12. Loading force is adjusted by means of a cup nut 15, mounted in the housing 1.

Figure 2:
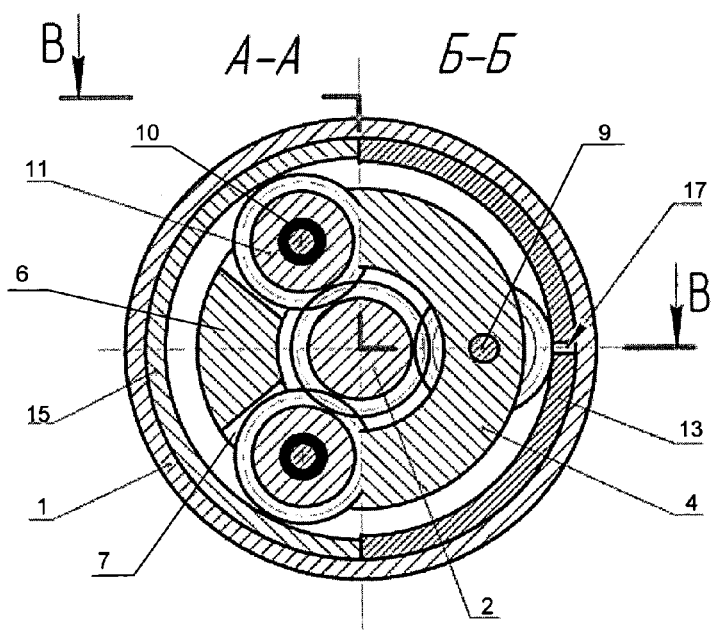
FIG. 2 sectional views A-A and B-B.
Figure 3:
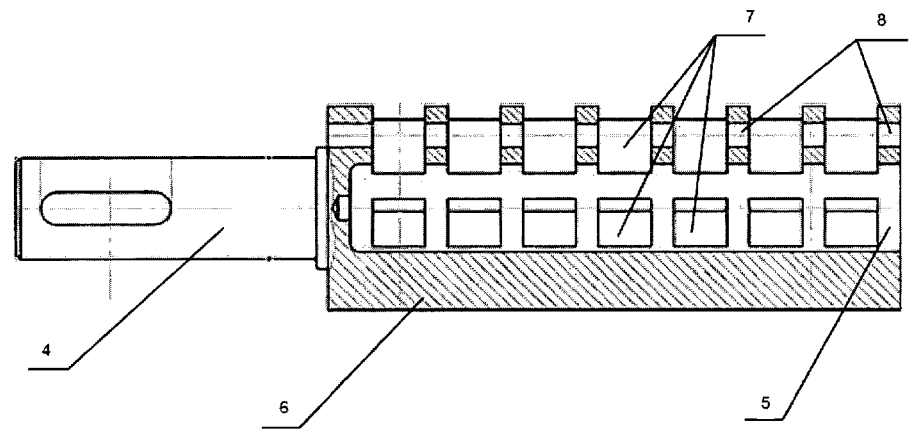
FIG. 3 a longitudinal axial sectional view of the carrier.
Figure 4:
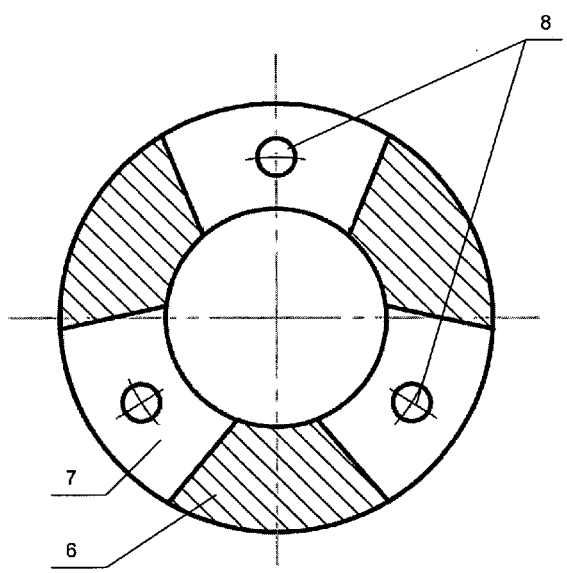
FIG. 4 a cross-sectional view of the carrier.

Spacer rings 13 are spliced, as indicated by a splice 17 shown in FIG. 2.

The optimal cone apex angle $\delta$ of the frictionally contacting tapers is in the range 60-90°. For the sake of simplicity, FIG. 1 shows an angle $\delta/2$ as an inclination angle between the taper generatrix and the central axis of the epcicyclic gear.

The claimed epicyclic gear operates as a traditional multiple-row epicyclic gear. As the central shaft 2 rotates, the planet gears 11 are rotated by the common gear 3 and convey the rotation to the carrier 4.

However, when unequal load distribution occurs among the rows of the planet gears 11, certain internally toothed ring gears 12 become loaded with a larger circumferential force than the other ones. This will primarily occur for the outer ring gears. Friction force between the spacer rings 13 adjacent to the most loaded separate toothed ring gears 12 and the housing 1 becomes insufficient, and said toothed ring gears 12 are circumferentially shifted, thus redistributing the load among all rows of the planet gears. In case of maximum load, value of which is set by adjusting the spring loading arrangement, all internally toothed ring gears 12 of the epicyclic gear become equally loaded. Exceeding a maximum torque under short periods of time is also admissible. In this mode of operation, the composite central internally toothed ring gear of the epicyclic gear acts as a safety joint.

In the claimed arrangement the housing 1 and the spacer rings 13 are connected without keys or spline connections, unlikely in the prototype, which improves the efficiency of production and reduces the overall radial dimension. Keys may be discarded due to the fact that when an axial force is applied to spliced spacer rings 13, the latter are pulled apart, as the force is applied to their tapered end faces. This causes an occurrence of a force radial component, which provides the necessary tension between the outer cylindrical surface of the spacer ring 13 and the inner surface of the housing 1.

Torque is conveyed from the internally toothed ring gears 12 to the spacer rings 13 by means of friction forces, but due to the tapers the friction force is stronger given the same axial thrust than in the prior art solutions where friction end faces are flat.

The optimal cone apex angle $\delta$ of the frictionally contacting tapers makes $\delta=60$-$90°$. The radial force in the point of contact between each friction spacer ring and the housing is 1.5-2 times stronger than the axial force provided by the spring loading arrangement, and the friction force between the major crowns and the spacer rings is by far stronger than the friction force between the spacer rings and the housing. The latter is necessary for the spacer rings to be shifted in an axial direction in the initial tightening of the loading arrangement and in the course of amortization of the elements from long-term operation of the gear, thus conveying the axial force to the other elements.

The invention claimed is:

1. A multiple-row epicyclic gear comprising a housing with an externally toothed central shaft mounted therein; a carrier with planet gears mounted in rows thereon; and a central internally toothed ring gear being composite and having major crowns, and friction spacer rings disposed between said major crowns, said major crowns and said friction spacer rings being pressed in an axial direction, wherein end faces of the friction spacer rings and counter-oriented end faces of the major crowns have tapered surfaces being in frictional contact, wherein the friction spacer rings are spliced and arranged to bring their outer cylindrical surfaces into frictional contact with the inner cylindrical surface of the housing.

2. The multiple-row epicyclic gear according to claim 1, wherein the planet gears are mounted in rows in corresponding apertures or through openings formed in the carrier so that each planet gear is disposed in a separate aperture or through opening.

3. The multiple-row epicyclic gear according to claim 1, wherein the externally toothed central shaft is single-crowned and is made in the form of a common gear.

4. The multiple-row epicyclic gear according to claim 2, wherein the externally toothed central shaft is single-crowned and is made in the form of a common gear.

5. The multiple-row epicyclic gear according to claim 1, wherein the tapered surfaces of the end faces of the major crowns and the friction rings, respectively, have a cone apex angle ($\delta$) of 60-90°.

6. The multiple-row epicyclic gear according to claim 1, wherein a spring and a cup nut is mounted in one end of the housing.

7. The multiple-row epicyclic gear according to claim 2, wherein the tapered surfaces of the end faces of the major crowns and the friction rings, respectively, have a cone apex angle ($\delta$) of 60-90°.

8. The multiple-row epicyclic gear according to claim 3, wherein the tapered surfaces of the end faces of the major crowns and the friction rings, respectively, have a cone apex angle ($\delta$) of 60-90°.

9. The multiple-row epicyclic gear according to claim 4, wherein the tapered surfaces of the end faces of the major crowns and the friction rings, respectively, have a cone apex angle ($\delta$) of 60-90°.

10. The multiple-row epicyclic gear according to claim 2, wherein a spring and a cup nut is mounted in one end of the housing.

11. The multiple-row epicyclic gear according to claim 3, wherein a spring and a cup nut is mounted in one end of the housing.

12. The multiple-row epicyclic gear according to claim 4, wherein a spring and a cup nut is mounted in one end of the housing.

13. The multiple-row epicyclic gear according to claim 5, wherein a spring and a cup nut is mounted in one end of the housing.

\* \* \* \* \*